United States Patent
Yu et al.

(10) Patent No.: US 10,364,989 B2
(45) Date of Patent: Jul. 30, 2019

(54) RANGE HOOD, STOVE AND COOKER INTEGRATED CONTROL SYSTEM

(71) Applicants: Shaoyan Yu, Foshan (CN); Guohan Lin, Foshan (CN); Qikui Xu, Foshan (CN); Zhenggen Liu, Foshan (CN); Zhichun Lu, Foshan (CN)

(72) Inventors: Shaoyan Yu, Foshan (CN); Guohan Lin, Foshan (CN); Qikui Xu, Foshan (CN); Zhenggen Liu, Foshan (CN); Zhichun Lu, Foshan (CN)

(73) Assignee: GUANGDONG MACRO GAS APPLIANCE CO., LTD., Foshan (CN)

( * ) Notice: Subject to any disclaimer, the term of this patent is extended or adjusted under 35 U.S.C. 154(b) by 146 days.

(21) Appl. No.: 15/547,467

(22) PCT Filed: Oct. 17, 2016

(86) PCT No.: PCT/CN2016/102253
§ 371 (c)(1),
(2) Date: Jul. 28, 2017

(87) PCT Pub. No.: WO2017/185666
PCT Pub. Date: Nov. 2, 2017

(65) Prior Publication Data
US 2018/0266695 A1    Sep. 20, 2018

(30) Foreign Application Priority Data

Apr. 25, 2016 (CN) .......................... 2016 1 0261302
Jul. 20, 2016 (CN) ...................... 2016 2 0774002 U

(51) Int. Cl.
*F24C 5/18* (2006.01)
*G05B 19/418* (2006.01)
(Continued)

(52) U.S. Cl.
CPC ................ *F24C 5/18* (2013.01); *F24C 3/122* (2013.01); *F24C 3/124* (2013.01); *F24C 7/083* (2013.01);
(Continued)

(58) Field of Classification Search
CPC .. F24C 3/122; F24C 3/124; F24C 5/18; F24C 15/2021; F24C 3/12; F24C 7/083;
(Continued)

(56) References Cited

U.S. PATENT DOCUMENTS 5,690,093 A * 11/1997 Schrank .............. F24C 15/2021
126/299 D

FOREIGN PATENT DOCUMENTS

| CN | 201344580 | * | 11/2009 |
| CN | 203168474 | * | 9/2013 |
| CN | 105795972 | * | 7/2016 |

* cited by examiner

*Primary Examiner* — Alfred Basichas
(74) *Attorney, Agent, or Firm* — CBM Patent Consulting, LLC

(57) ABSTRACT

A range hood, stove and cooker integrated control system, comprising a range hood, a stove and a cooker, wherein the rang hood comprises a range hood controller and a motor connected with the range hood controller; the stove comprises a stove controller and a gas ratio valve connected with the stove controller; a cooker controller and a control button connected with the cooker controller are disposed on a cooker handle; and the cooker controller is in communication with the range hood controller and the stove controller via a wireless signal transceiver.

9 Claims, 4 Drawing Sheets

(51) Int. Cl.
*F24C 3/12* (2006.01)
*F24C 15/20* (2006.01)
*G05B 19/04* (2006.01)
*G05B 19/05* (2006.01)
*F24C 7/08* (2006.01)
*H05B 1/02* (2006.01)
*G05B 19/042* (2006.01)

(52) U.S. Cl.
CPC ........ *F24C 15/2021* (2013.01); *G05B 19/041* (2013.01); *G05B 19/058* (2013.01); *G05B 19/418* (2013.01); *H05B 1/0266* (2013.01); *G05B 19/042* (2013.01); *G05B 2219/2643* (2013.01); *H05B 2213/06* (2013.01); *Y02P 90/02* (2015.11)

(58) Field of Classification Search
CPC .. G05B 19/418; G05B 19/058; G05B 19/041; G05B 19/042; G05B 2219/2643; Y02P 90/02; H05B 3/00
See application file for complete search history.

RANGE HOOD, STOVE AND COOKER INTEGRATED CONTROL SYSTEM

This application is the U.S. national phase of International Application No. PCT/CN2016/102253 filed on 17 Oct. 2016 which designated the U.S. and claims priority to Chinese Application Nos. CN 201610261302.3 and CN201620774002.0 filed on 25 Apr. 2016 and 20 Jul. 2016, respectively, the entire contents of each of which are hereby incorporated by reference.

TECHNICAL FIELD

The present invention relates to the technical field of controlling kitchen electrical product, more specifically, to a range hood, stove and cooker integrated control system.

BACKGROUND

Range hood, stove and cooker cannot embody their respective functions owned by themselves when they are used separately. In prior art, the three products are separated to be an independent sub-system, but it can be obtained a good effect by requiring the cooperation of the three products rather than by independently using each product by the consumer in use, so the technical solution should be considered from the entire system.

SUMMARY

The purpose of the present invention is to provide a range hood, stove and cooker integrated control system which is easy to manipulate.

To achieve above purpose, the present invention employs the following technical solution.

A range hood, stove and cooker integrated control system, comprising a range hood, a stove and a cooker, wherein the rang hood comprises a range hood controller and a motor connected with the range hood controller; the stove comprises a stove controller and a gas ratio valve connected with the stove controller; a cooker controller and a control button connected with the cooker controller are disposed on a cooker handle; and the cooker controller is in communication with the range hood controller and the stove controller via a wireless signal transceiver.

As an improvement, the cooker comprises a pot and a turner; and the control button is disposed on a pot handle and/or a turner handle.

As an improvement, a temperature sensor connected with the cooker controller and used for detecting the temperature of the pot is disposed at the bottom of the pot; and when the temperature of the pot reaches a required temperature preset by a user, the firepower of the stove and air volume of the range hood are automatically adjusted.

As an improvement, the cooker controller is connected with a first wireless signal transceiver; the range hood controller is connected with a second wireless signal transceiver; the stove controller is connected with a third wireless signal transceiver; the cooker controller is in communication with the range hood controller via the first wireless signal transceiver and the second wireless signal transceiver, and is in communication with the stove controller via the first wireless signal transceiver and the third wireless signal transceiver.

As an improvement, the wireless signal transceiver is a wireless radio frequency module, a WiFi module, a Bluetooth module or a ZigBee module.

As an improvement, the motor is a DC (direct current) motor or an AC (alternating current) variable frequency motor.

As an improvement, the cooker controller is connected with a display embedded in the cooker handle.

As an improvement, the control button comprises a range hood start/stop button, a range hood function switching button, a stove start/stop button and a stove function switching button.

As an improvement, the cooker controller is connected with a prompt device for prompting the user to operate, the prompt device being a display, a voice prompt device or an indicator; when the temperature in the pot reaches the required temperature preset by the user, the prompt device transmits a corresponding prompt signal to help the user determine whether the functions of the range hood and the stove are required to be correspondingly adjusted.

The beneficial effect of the invention is:

When in manual mode, the stove controller adjusts the opening degree of the gas ratio valve or the electrical plug valve according to a control instruction transmitted by manipulating the control button on the cooker handle, so as to automatically adjust the firepower of the stove and start/stop the stove. When the fume in the pot changes, the range hood controller adjusts the rotating speed of the motor according to a control instruction transmitted by manipulating the control button, so as to control the change of different air volumes. When in automatic mode, when the temperature in a pot reaches a required temperature preset by a user, the firepower of the stove and the air volume of the range hood are adjusted automatically, the whole process of which can be achieved by operating the cooker without operating the stove and the range hood with a hand, thus facilitating quick control.

REFERENCE NUMBER DESCRIPTION

1: range hood, 2: stove, 3: cooker, 4: first wireless signal transceiver, 5: second wireless signal transceiver, 6: third wireless signal transceiver.
1-1: range hood controller, 1-2: motor.
2-1: stove controller, 2-2: gas ratio valve.
3-1: cooker controller, 3-2: control button, 3-3: temperature sensor, 3-4: display.

DETAILED DESCRIPTION

To facilitate a person skilled in the art better understand the nature of the present invention, the following further describes the specific embodiments of the present invention in detail by combining the drawings.

Figure 1:
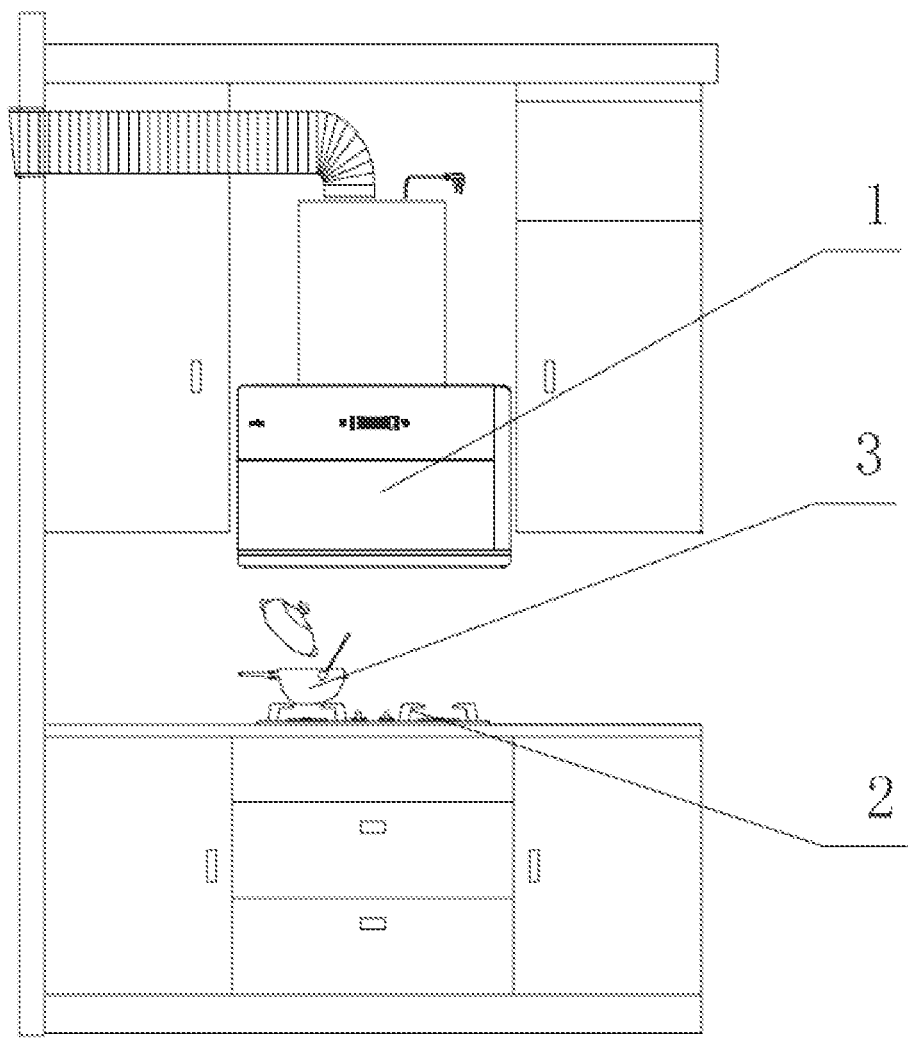
FIG. 1 is a structural schematic view of the range hood, stove and cooker integrated control system provided by the present invention.
Figure 2:
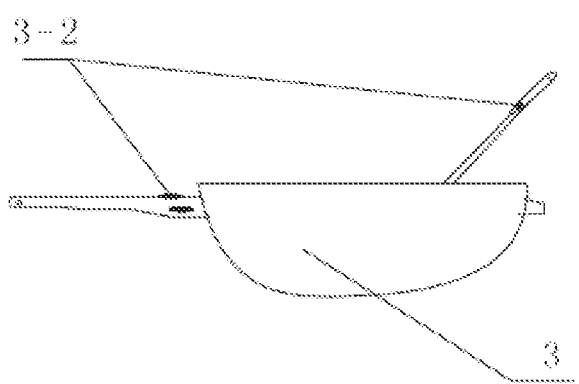
FIG. 2 is a structural schematic view of the cooker.
Figure 3:
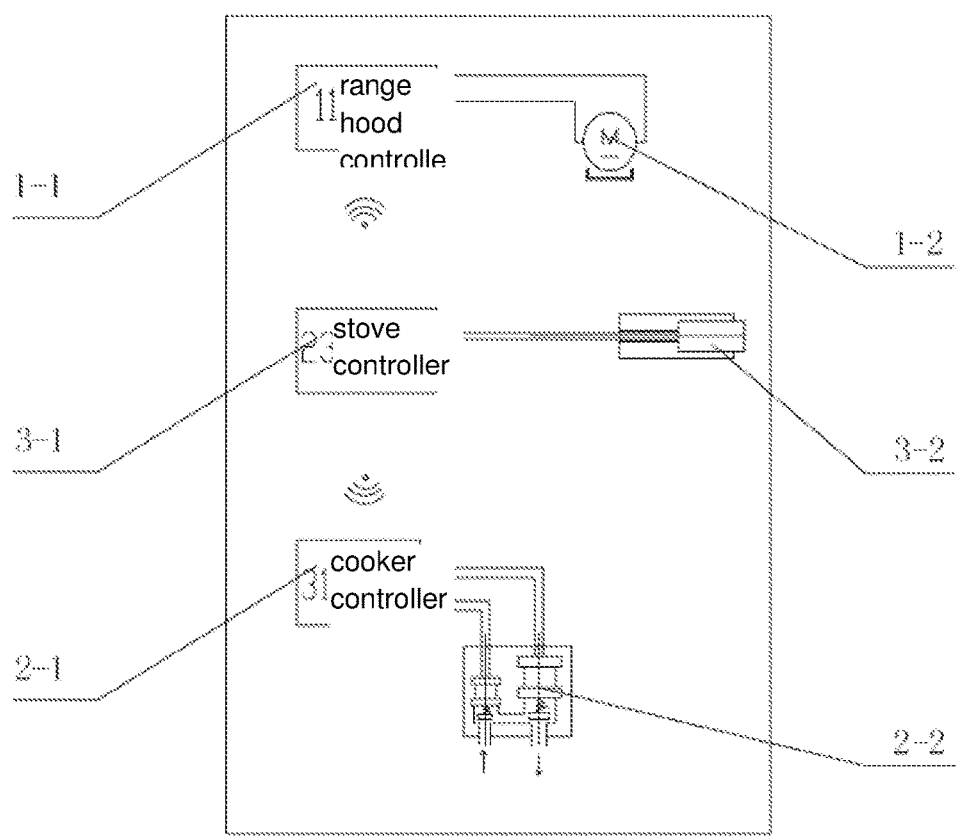
FIG. 3 is a structural block view of the range hood, stove and cooker integrated control system provided by the present invention.
Figure 4:
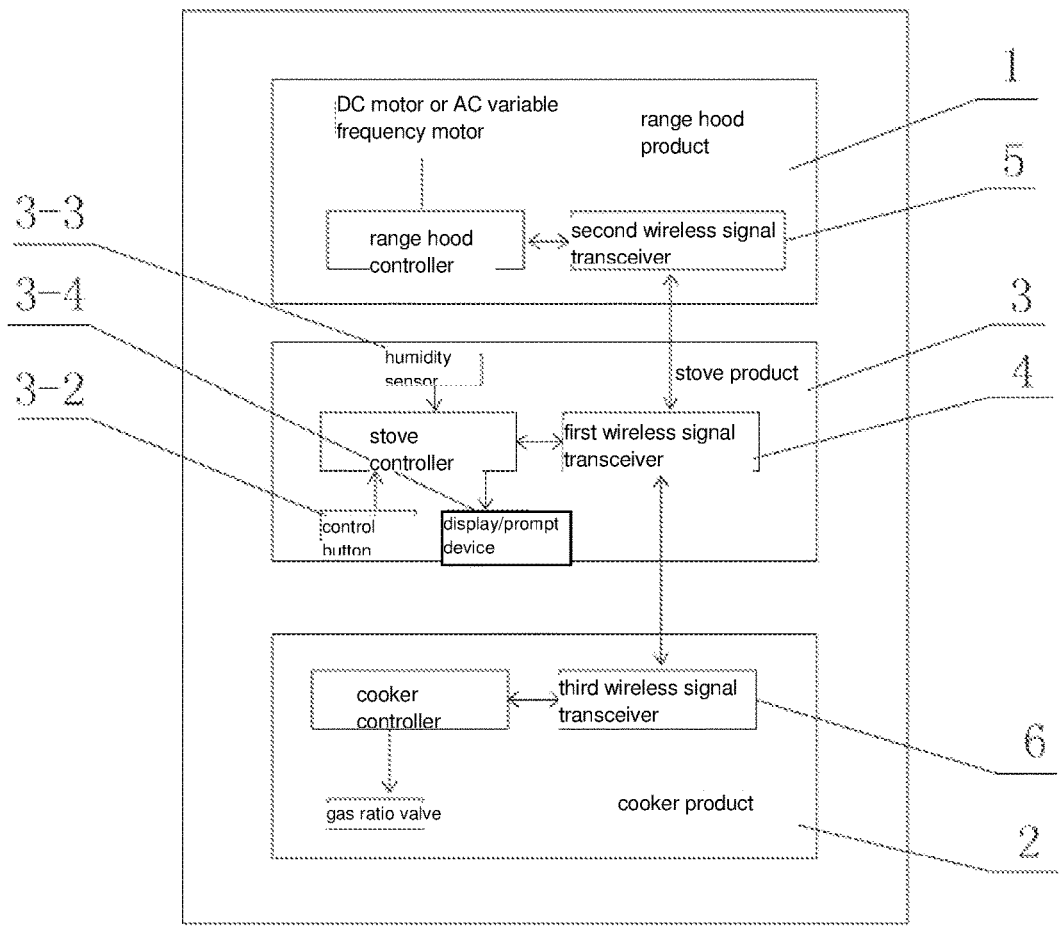
FIG. 4 is a structural refinement view of FIG. 3.

As shown in FIG. 1-4, a range hood, stove and cooker integrated control system, comprising a range hood 1, a stove 2 and a cooker 3, wherein the rang hood 1 comprises a range hood controller 1-1 and a motor 1-2 connected with the range hood controller 1-1; the stove 2 comprises a stove controller 2-1 and a gas ratio valve 2-2 connected with the stove controller 2-1; a cooker controller 3-1 and a control button 3-2 connected with the cooker controller 3-1 are disposed on a cooker 3 handle; and the cooker controller 3-1 is in communication with the range hood controller 1-1 and the stove controller 2-1 via a wireless signal transceiver.

Wherein the motor 1-2 is a DC motor for enabling the stepless adjustment of the air volumes for the range hood. The wireless signal transceiver is a WiFi module for ensuring the reliability of signal transmission. In other embodiments, the motor is modified as an AC variable frequency motor, and the wireless signal transceiver is replaced by a wireless radio frequency module, a bluetooth module or a ZigBee module, being unlimited to the present embodiment.

The control button 3-2 includes: a range hood start/stop button, a range hood function switching button, a cooker start/stop button and a cooker function switching button. When in manual mode, the stove controller adjusts the opening degree of the gas ratio valve or the electrical plug valve according to a control instruction transmitted by manipulating the control button on the cooker handle, so as to automatically adjust the firepower of the stove and start/stop the stove. When the fume in the pot changes, the range hood controller adjusts the rotating speed of the motor according to a control instruction transmitted by manipulating the control button on the turner handle, so as to control the change of different air volumes. When in automatic mode, when the temperature in a pot reaches a required temperature preset by a user, the firepower of the stove and the air volume of the range hood are adjusted automatically, the whole process of which can be achieved by operating the cooker without operating the stove and the range hood with a hand, thus facilitating quick control.

In the present embodiment, the cooker 3 comprises a pot and a turner; and the control button 3-2 is disposed on a pot handle and a turner handle; a temperature sensor 3-3 connected with the cooker controller 3-1 and used for detecting the temperature of the pot is disposed at the bottom of the pot. In cooking process, the user manipulating the operating parameters of the stove and range hood is provided with data by the temperature sensor 3-3 detecting the temperature at the bottom of the pot in real time. Particularly, to display the operating parameters of the range hood, stove and cooker for providing an effect of human-computer interaction, a display 3-4 is connected on the cooker controller 3-1, the display 3-4 being embedded in the handle of the cooker 3, the display 3-4 displaying the operation status of the range hood, stove and the operating temperature of the cooker in real time according to the feedback information from the range hood controller, stove controller. In other embodiments, the control button 3-2 is arranged on one of the pot handle and turner handle, being unlimited to the present embodiment.

More specifically, the wireless communication mode between the cooker controller 3-1 and the hood controller 1-1, the stove controller 2-1 is: the cooker controller 3-1 is connected with a first wireless signal transceiver 4; the range hood controller 1-1 is connected with a second wireless signal transceiver 5; the stove controller 2-1 is connected with a third wireless signal transceiver 6; the cooker controller 3-1 is in communication with the range hood controller—1-1 via the first wireless signal transceiver 4 and the second wireless signal transceiver 5, and is in communication with the stove controller 2-1 via the first wireless signal transceiver 4 and the third wireless signal transceiver 6.

Further, the cooker controller is connected with a prompt device for prompting the user to operate, the prompt device being a display, a voice prompt device or an indicator. When the temperature in the pot reaches the required temperature preset by the user, the prompt device transmits a corresponding prompt signal to help the user determine whether the functions of the range hood and the stove are required to be correspondingly adjusted.

The range hood, stove and cooker integrated control system provided by the present embodiment feeds back the function information of the range hood, stove, pot to the handle button simultaneously, and prompts the user to make corresponding operation, so that each function of the range hood, stove, pot or turner etc. can be united to be a system playing the effects that a single sub-system cannot reflect. Particularly, various functions such as automatic adjustment of firepower for the stove and air volumes for the range hood can be achieved by disposing a temperature sensor on the pot, thus facilitating the user to operate and allowing the range hood, stove and cooker to constitute a system wherein each part functions coordinately, works efficiently.

The above specific embodiments merely described the nature of the present invention in detail, being unlimited to the scope of the present invention. Apparently, many improvements and modifications such as replacing the gas ratio valve with the motor plug valve can be made by those skilled in the art under the teachings of the present invention. It should be noted that these improvements and modifications fall within the scope of the claims of the present invention.

What is claimed is:

1. A range hood, stove and cooker integrated control system, comprising a range hood, a stove and a cooker, wherein the rang hood comprises a range hood controller and a motor connected with the range hood controller; the stove comprises a stove controller and a gas ratio valve connected with the stove controller; a cooker controller and a control button connected with the cooker controller are disposed on a cooker handle; and the cooker controller is in communication with the range hood controller and the stove controller via a wireless signal transceiver; the cooker comprises a pot and a turner; and the control button is disposed on a pot handle and/or a turner handle; a temperature sensor is disposed at the bottom of the pot and connected with the cooker controller.

2. The range hood, stove and cooker integrated control system according to claim 1, characterized in that, the temperature sensor is used for detecting the temperature of the pot; and when the temperature of the pot reaches a required temperature preset by a user, the firepower of the stove and air volume of the range hood are automatically adjusted.

3. The range hood, stove and cooker integrated control system according to claim 1, characterized in that, the cooker controller is connected with a first wireless signal transceiver; the range hood controller is connected with a second wireless signal transceiver; the stove controller is connected with a third wireless signal transceiver; the cooker controller is in communication with the range hood controller via the first wireless signal transceiver and the second wireless signal transceiver, and is in communication with the stove controller via the first wireless signal transceiver and the third wireless signal transceiver.

4. The range hood, stove and cooker integrated control system according to claim 1, characterized in that, the wireless signal transceiver is a wireless radio frequency module, a WiFi module, a Bluetooth module or a ZigBee module.

5. The range hood, stove and cooker integrated control system according to claim 1, characterized in that, the motor is a DC (direct current) motor or an AC (alternating current) variable frequency motor.

6. The range hood, stove and cooker integrated control system according to claim 1, characterized in that, the cooker controller is connected with a display embedded in the cooker handle.

7. The range hood, stove and cooker integrated control system according to claim 1, characterized in that, the control button comprises a range hood start/stop button, a range hood function switching button.

8. The range hood, stove and cooker integrated control system according to claim 7, characterized in that, the stove controller adjusts the opening degree of the gas ratio valve or the electrical plug valve according to a control instruction transmitted by manipulating the control button on the cooker handle, so as to automatically adjust the firepower of the stove and start/stop the stove; when the fume in the pot changes, the range hood controller adjusts the rotating speed of the motor according to a control instruction transmitted by manipulating the control button, so as to control the change of different air volumes.

9. The range hood, stove and cooker integrated control system according to claim 1, characterized in that, the cooker controller is connected with a prompt device for prompting the user to operate, the prompt device being a display, a voice prompt device or an indicator; when the temperature in the pot reaches the required temperature preset by the user, the prompt device transmits a corresponding prompt signal to help the user determine whether the functions of the range hood and the stove are required to be correspondingly adjusted.

* * * * *